US007922369B2

(12) United States Patent
Condon et al.

(10) Patent No.: US 7,922,369 B2
(45) Date of Patent: Apr. 12, 2011

(54) COMPLEX OPTICAL LENS APPARATUS FOR CREATING RECTANGULAR LIGHT OUTPUT DISTRIBUTION

(75) Inventors: Patrick Jeffrey Condon, Morris, IL (US); Mark Bryan Pruss, Coal City, IL (US)

(73) Assignee: TecNiq, Inc., Wilmington, IL (US)

( * ) Notice: Subject to any disclaimer, the term of this patent is extended or adjusted under 35 U.S.C. 154(b) by 356 days.

(21) Appl. No.: 11/865,449

(22) Filed: Oct. 1, 2007

(65) Prior Publication Data

US 2009/0086498 A1 Apr. 2, 2009

(51) Int. Cl.
*F21V 3/02* (2006.01)

(52) U.S. Cl. .................. 362/311.01; 362/511; 362/520; 362/309; 362/336; 362/311.06; 313/512

(58) Field of Classification Search .......... 362/520–522, 362/516–518, 511, 509, 326–329, 335–337, 362/311.01, 309, 307; 313/512
See application file for complete search history.

(56) References Cited

U.S. PATENT DOCUMENTS

| | | | | |
|---|---|---|---|---|
| 2,328,329 | A * | 8/1943 | Dickson | 362/334 |
| 4,371,916 | A * | 2/1983 | De Martino | 362/511 |
| 6,536,923 | B1 * | 3/2003 | Merz | 362/327 |

* cited by examiner

*Primary Examiner* — Ismael Negron
(74) *Attorney, Agent, or Firm* — Boyle Fredrickson, S.C.

(57) ABSTRACT

A device having an inner surface with a combination of reflective and refractive surface facets swept about an axis of revolution perpendicular to the optical axis of the device. The outer surface has a non-planar, non-circular, non-spherical shape. This outer surface generates an appropriate intensity distribution in a direction generally parallel to the major axis of the output rectangle and may also distribute energy generally parallelly to the minor axis of the output rectangle as well.

17 Claims, 18 Drawing Sheets

COMPLEX OPTICAL LENS APPARATUS FOR CREATING RECTANGULAR LIGHT OUTPUT DISTRIBUTION

CROSS-REFERENCE TO RELATED APPLICATION

This application claims the benefit of U.S. Provisional Application Ser. No. 60/848,325, filed Sep. 29, 2006.

FIELD OF THE INVENTION

The present invention relates generally to the redistribution of radiant energy, particularly electromagnetic energy to achieve efficient and more cost effective products. More particularly, it relates to an apparatus and method for the efficient distribution of light energy from a conical wide-angle source into a high aspect ratio rectangular output pattern.

BACKGROUND OF THE INVENTION

There are many situations where electromagnetic energy is required to be distributed into a rectangular output. In the vast majority of these situations a high efficiency transfer of source energy is desirable. This is particularly true in regulated lighting. For example, overland vehicle safety lighting, aircraft lighting, street lamp lighting and marine lighting often require specific output patterns that are mandated by government regulations to have minimum and maximum illumination values and which vary substantially in different directions. In each case, regulations typically have minimum photometric or radiometric requirements that must be met by the device. In many cases, the output distribution requirement is rectangular in angle space. Rectangular or rectangular shaped output distribution, refers to an output light distribution of some degrees in width as measured using a type A goniometer from a first plane and an output light distribution of a different number of degrees in width as measured using a type A goniometer along a second orthogonal plane. The resulting pattern is rectangular when plotted graphically on a Cartesian graph having a horizontal and vertical axis corresponding to the two axes of the type A goniometer.

References to electromagnetic radiation or light in this application are intended as references to the entire electromagnetic spectrum, including the visible spectrum and all non-visible wavelengths including but not limited to infrared, ultraviolet, x-ray, gamma ray and microwave wavelengths.

The present invention deals in particular with high aspect ratio rectangles where the rectangle is dimensionally wide in a first direction and narrow in a second orthogonal direction. For instance, an amber PC rated side-marker clearance light requires an even minimum intensity of 0.62 Candellas (Cd's) over 180 degrees in the horizontal plane and over 20 degrees in an orthogonal vertical plane as measured by a type A goniometer. In this instance, the 180 degrees by 20 degrees represents a high aspect ratio rectangle in angle space. This general type of pattern having a large major axis greater than 100 degrees in total width and having a minor axis less than 50 degrees in total width will be referred to as a High Aspect Ratio (HAR) rectangular output throughout this application.

Light Emitting Diodes or LED's are solid state electrical devices with high efficiencies and long lives. LED's are naturally impact resistant, use very little power and often have 100,000 hour life spans. These features make these devices preferable for use in safety lighting. The primary disadvantage of LED light sources is their cost. If the efficiency of an optical device to distribute light from the LED source into the regulated pattern could be improved, fewer LED's could be used resulting in a lower cost safety device.

In the past, high output LED's were typically manufactured with lenses incorporated over the emitting solid state chip or dice in a through-hole type electrical package The lens was typically employed to concentrate the LED light from the dice into a narrower high intensity pattern. Unfortunately, the nature of these lenses typically meant that complex secondary optics were required for use with the LED for redistributing the light into certain wide output regulated safety patterns. This increased the amount of LED source energy necessary to meet these HAR output pattern requirements.

Recently, LED manufacturers have turned to surface mountable LED devices that have superior heat removal from the diode junction and higher optical flux per watt. These devices are now being regularly provided with a flat output surface free from the source distorting optics of past LED's. These devices have very wide uncollimated output distributions with typical viewing angles greater than 100 degrees. The viewing angle for the purposes of this application is defined as the full angular width of the optical distribution where the light output reaches 50% of the intensity measured on the optical axis. LED's of this type have generally symmetrical outputs around the center or optical axis, thus a stated viewing angle of 10 degrees describes a conical output distribution where 50% of the peak intensity value occurs at 5 degrees from the optical or center axis of the device. A 120 degree viewing angle device, which is very common in wide output angle LEDs, defines a device which has an output intensity of 50% at an angle of 60 degrees from the optical axis.

High output LED's with hemispherical and output intensity closely following that of a Lambertian plane emitter have recently become increasingly available. These LED's output a highly diffuse illumination pattern with a very predictable intensity distribution closely following the trigonometric cosine function. However an unmodified hemispherical emitter is highly inefficient in meeting HAR rectangular output distribution as defined above.

LED devices with lenses incorporated therein have typically limited many of the devices to a narrow output pattern. The generation of high aspect ratio rectangles with widths greater than 90 degrees require the use of sensitive and delicate high angle reflective optical surfaces for the distribution of light beyond 45 degrees to the normal. The result is that many of these lights today incorporate multiple LED's arranged at different angles for generating the high angles required for the patterns.

One such design in production today uses a combination of axially revolved refractive and reflective surfaces from multiple old style LED's to collect and distribute the light into a +/−45 degree pattern. In this design, the axis of revolution of the inner surfaces is placed near the LED and run perpendicular to the long axis of the angle space rectangle defined by the requirement. The outer surfaces of the device made in accordance with this design typically consist of a single or just a few planes and did not consist of complex shapes. This type of optical lens has been in production since at least 1999. Unfortunately, the narrow output of the older LED sources and simple planar outer surfaces make this type of optic impractical for meeting evenly illuminating wider rectangular requirements.

SUMMARY OF THE INVENTION

It is therefore an object of the present invention to provide an improved non-imaging optical lens apparatus for the creation of HAR rectangular patterns with a primary axis greater than 100 degrees from non-rectangular wide output sources.

It is another object of the present invention to provide a means for shaping light into a HAR rectangular output pattern.

It is a further object of the present invention to provide a higher efficiency and lower cost approach to the design of HAR rectangular output non-imaging optics.

It is yet a further object of the present invention to provide vehicle lights such as overland vehicle turn signals, stop lamps, identification lamps, side marker lamps and clearance lamps that are efficient and cost effective.

It is yet another object of the present invention to provide vehicle lights such as marine vessel navigation lighting such as bow lights, side lights, stern lights and steaming lights that are efficient and cost effective.

It is a still further object to provide a lens apparatus, a lighting device and a method of distributing light energy so as to come overcome one or more drawbacks of the prior art.

These and other objects and advantages are achieved in a light transforming method and device that includes the use of a wide viewing angle source in combination with a lens having a plurality of specifically shaped surfaces designed to generate a HAR rectangular output distribution with a primary axis greater than 100 degrees.

In accordance with the present invention, energy from a wide output light source such as a hemispherical Lambertian surface mount LED is collected by a complex lens comprised in part of a cylindrically shaped axially revolved first, inner set of refractive and reflective surfaces. The axis of revolution is oriented orthogonally to a plane parallel to the major axis of the rectangular requirement and intersecting the source focal point. In practice the axis is typically oriented vertically for regulated safety lighting products. The collection surfaces above are designed to reduce the viewing angle of the beam in the direction of the axis of revolution above which is generally orthogonal to the major axis of the output image rectangle. The light energy passes from the collection surfaces into the lens material where it strikes a second outer surface or surfaces with complex curvature in one or more directions. This outer surface generates an appropriate intensity distribution in a direction generally parallel to the major axis of the output rectangle and may also distribute energy generally parallelly to the minor axis of the output rectangle as well.

It is important to note that the present invention relates not only to the use of wide output LED sources in conjunction with an old style lens, but it also relates to the addition of a complex outer surface to the cylindrically shaped axially revolved lens for further light control necessary to generate wide output distributions. In practice, sources have a variety of output distributions which may or may not correspond to a pre-determined rectangular output distribution. The outer surface of the present invention is well suited to control the light energy on two orthogonal axes substantially independently and its combination with an axially revolved inner first surface results in significant control in the final output distribution. This results in an improvement in lens and overall product energy efficiency.

The optical efficiency improvement in the design of this improved LED-based product has several direct benefits including; increased reliability, lower operating temperature, reduced electrical requirements, greater product life and significantly reduced cost as compared to existing LED products. The resulting cost savings attendant with the implementation of the present invention makes high performance LED lamps more accessible to the general public and improves vehicle safety.

BRIEF DESCRIPTION OF THE DRAWINGS

The subject matter, which is regarded as the invention, is particularly pointed out and distinctly claimed in the concluding portion of this specification. The invention, together with further objects and advantages thereof, may best be understood by reference to the following description taken in connection with the accompanying drawings.

DETAILED DESCRIPTION

Figure 3:
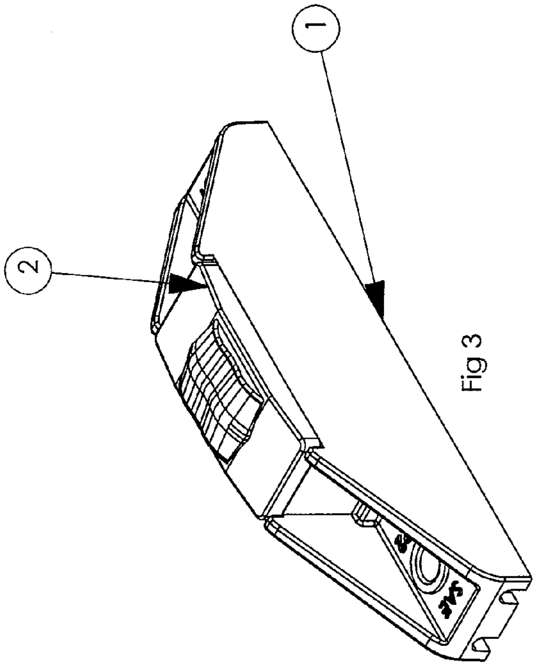
FIG. 3 is a perspective view of the sidemarker clearance lamp of FIG. 1.

The present invention relates to an improved rectangular light pattern generating method and devices and lenses made therefrom. The lenses and devices made in accordance with the method of the present invention have wide ranging uses in various applications including portable lamps and specialty lighting, over-land vehicles, watercraft, aircraft and manned spacecraft, automobiles, trucks, boats, ships, buses, vans, recreational vehicles, bicycles, motorcycles, mopeds, motorized cars, electric cars, airplanes, helicopters, space stations, shuttlecraft and the like.

The present invention provides an energy efficient and highly accurate method for distributing a wide output diffuse source of electromagnetic radiation (light) into a pre-determined rectangular requirement. Such wide output light distributions can be generated from nearly any source including but not limited to incandescent lamps, LED's, arc and gas discharge lamps.

In a typical application of the present invention, light from a wide output angle source such as certain LED's or incandescent lamps is first collected and partially collimated by a plurality of inner optical surfaces of a lens. These inner optical surfaces are comprised of multiple refractive and reflective surfaces revolved about an axis. The resulting light collection lens has a circular curvature when sectioned by any plane intersecting the optic perpendicular to the axis of revolution. Additionally the optic has a multi-faceted single or multi-focal Fresnel lens of constant shape when sectioned by any plane parallel to and intersecting the axis of revolution and the inner collecting optic surfaces. The light from the collection lens is directed into the transparent lens material. The angular limits of the majority of the energy inside the lens material will typically be comprised of a waveform that is less than 30 degrees wide in one minor axis direction and greater than 100 degrees wide in a second major axis direction. A device in accordance with the present invention will cause this beam to impinge on a second complex non-planar, non-cylindrical, non-circular outer surface such that the outer surface will re-distribute the energy using the laws of refraction and reflection in at least the major axis to generate the required output.

The reflective surfaces employed in accordance with the present invention are created using internal reflection or a mirrored coating to cause the light to reflect off of a desired surface rather than passing through the surface in refraction. Internal reflection occurs when electromagnetic energy or light strikes a surface at an angle greater than the critical angle of the material resulting in a lossless reflection of 100% of the light energy.

In order to create a device or lens of the present invention, it is first necessary to determine the parameters of the device, including the requirement and intensity to be projected and the light source to be used. Once these parameters are ascertained, an appropriate collection optic and outer lens surface can be shaped by a wide variety of computerized software lens optimization algorithms or spreadsheet based techniques.

Consider a LED (light emitting diode) PC rated sidemarker or clearance light defined by the U.S. Department of Transportation standard FMVSS108 for an overland vehicle. An Amber light made in accordance with that standard requires 0.62 Candelas (Cd's) over a minimum of 180 degrees as measured in the horizontal plane along the major axis and 20 degrees as measured in a vertical plane along the minor vertical axis. By employing the present invention, an approximate 70% power savings over the typical industry lamps on the market can be achieved, e.g. a source of less than 7 lumens. The product cost savings realized in an LED based product from the reduced power requirement can be extended to other vehicle systems resulting in multiple improvements including: lighter wiring harnesses; smaller batteries and alternators and even reduced warranty claims.

Another application of the present invention is in bow lights for marine vessels as specified in COLREGS by the US coast guard. Each bi-color bow light contains a red and green illuminated section. Each section covers a specific rectangular range of requirements in angle space. The rectangular requirement is a minimum of 112.5 degrees as measured in a horizontal plane and 7.5 degrees measured up and down from the horizontal plane for a total included angle of 15 degrees. Unlike sidemarker clearance lights which are required to have an equal intensity at all required angles, the marine regulated bow light has a complex intensity distribution in the vertical direction. Again, a device in accordance with the present invention offers substantial cost savings over existing designs.

The manufacturing of a lens in accordance with the present invention may be accomplished through a variety of processes including but not limited to; injection molding, directly cutting the surface into transparent material and polishing the surface and others. The preferred method for mass production of a device made in accordance with the present invention is injection molding because of the complex shapes required for the lens. The lens can be made of any material transparent to electromagnetic energy or light including but not limited to polycarbonate, acrylic, polystyrene and glass.

A wide variety of computational algorithms in spreadsheets or software can be used to compute an appropriate surface shape for the lens. In using such algorithms, particular attention must be paid to the percent transmission of the light at higher angles of incidence to the surface normal and the output waveform distortion at high angles of incidence. The algorithms must also be constrained in an appropriate manner such that manufacturable surfaces are computed.

The angle of refraction of light through a surface is governed by Snells law. Snell's law gives the relationship between angles of incidence and refraction for a wave impinging on an interface between two media with different indices of refraction. Like any continuous mathematical function Snells law can be approximated by a linear function when considered over a small enough angle.

Using an appropriate inner cylindrically revolved waveform compression surface in combination with a wide output angle source it is possible to create a less than optimal high aspect ratio rectangle in angle space inside the material. If this less than optimally shaped rectangle emits from the second surface with similar angular and intensity dimensions to the required output rectangle, it is possible to compute a manufacturable output surface to shape the light into an output distribution without exceeding the substantially linear range of Snells law. By computing a surface which remains in a substantially linear range of Snells law the light output distribution on horizontal and vertical axes can be independently controlled.

Therefore, in accordance with the present invention, the output distribution in the vertical direction is directly controlled by shaping a profiled curvature in the vertical direction and sweeping it through an appropriate curvature in the horizontal direction. Similarly, the output distribution in the horizontal direction is controlled by sweeping the vertical profile through the required complex horizontal curvature. It is this substantially independent control that allows the use of the second surface to shape each axis individually and separately resulting in a high efficiency matching of the output to the required pattern. This results in a significant advantage over the prior art in lights which distributes a wide output diffuse source of electromagnetic radiation (light) into a pre-determined rectangular requirement.

The Figures show four different devices made in accordance with the present invention. FIGS. 1 through 4 depict four views of a PC rated sidemarker clearance light with a single LED source where the lens is configured to project the Federal Motor Vehicle Safety Standard 108 (FMVSS 108) regulated PC sidemarker clearance light pattern. FIGS. 16 through 19 show four standard views of a bi-color marine bow light with a single red LED behind a port lens in accordance with the present invention and a single green LED behind a second starboard lens in accordance with the present invention. FIGS. 20 through 23 shows 4 standard views of a single color marine regulated bow light with a single red LED behind a port side lens in accordance with the present invention. Finally, FIGS. 24 through 27 show 4 standard views of a single color marine regulated bow light with a single green LED behind a starboard lens in accordance with the present invention.

Figure 4:
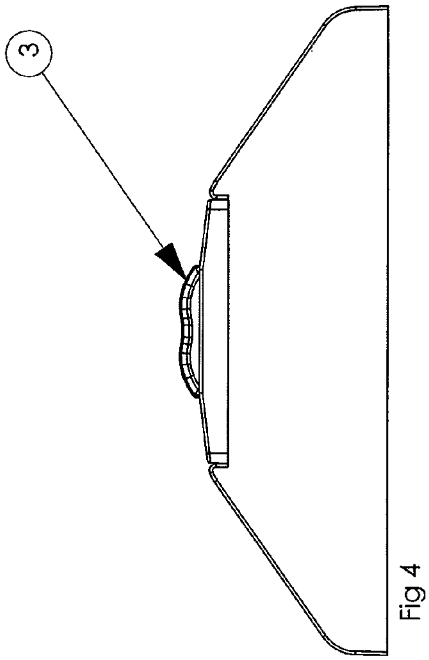
FIG. 4 is a side view of the sidemarker clearance lamp of FIG. 1.
Figure 1:
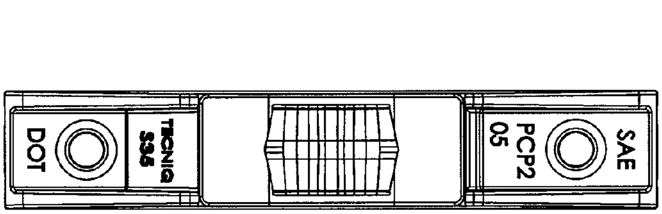
FIG. 1 is a top view of one embodiment of a sidemarker clearance lamp made in accordance with the present invention.
Figure 2:
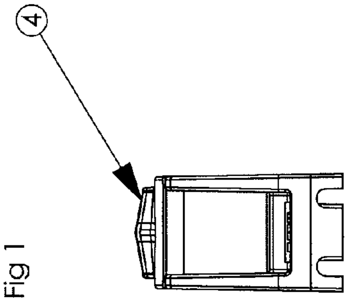
FIG. 2 is a front view of the sidemarker clearance lamp of FIG. 1.

Referring to FIG. 3, the body of the light is constructed in two parts to create a waterproof seal. In this embodiment, the lens 1 is preferably sonically welded to the base 2. In FIG. 2 the complex curvature of the outer surface 4 designed to generate the minor axis of the output distribution is shown. FIG. 4 shows the complex curvature of the outer second surface 3 used to generate the major axis of the output distribution.

Figure 6:
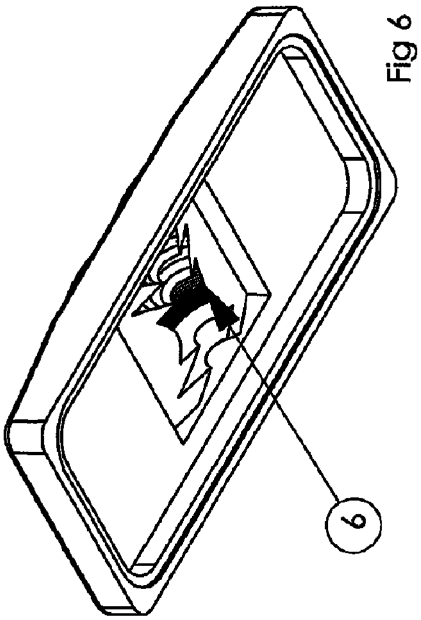
FIG. 6 is a perspective view of an axially revolved collection optic of one embodiment of the present invention comprised of refractive and internally reflective surfaces made in accordance with the present invention.
Figure 5:
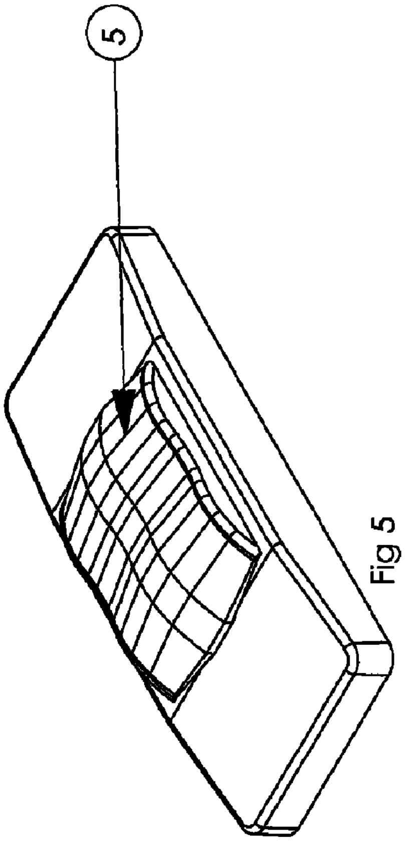
FIG. 5 is a perspective view of a complex outer refractive surface made in accordance with one embodiment the present invention.

FIG. 5 is an isometric top view of the lens shown in FIGS. 1 through 4 depicting the complex outer lens surface used to control the output energy distribution of the present invention. The surface 5 is the outer lens surface used to control the output energy distribution along the major and minor axes. FIG. 6 is a perspective view of the inner lens surfaces 6 used to collect the energy from the LED source in this embodiment and direct it toward the outer surface 5.

Figure 7:
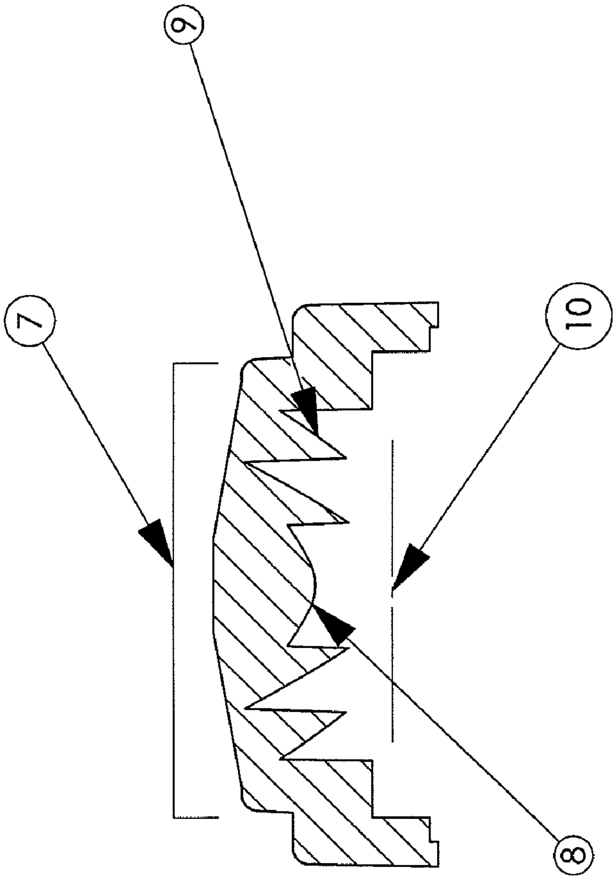
FIG. 7 is a cross-sectional view of the lens of FIG. 6 made parallel to the inner lens axis of revolution depicting the complex outer and inner surfaces of a sidemarker clearance lamp made in accordance with one embodiment of the present invention.

Referring to FIG. 7, this drawing is a section view of the lens part shown in FIGS. 5 and 6 parallel to the physical minor axis of the part. The complex outer surface 7 shape is used to control the energy distribution in the output pattern along the minor axis of the required output rectangle. The inner surface is comprised of Fresnel type facets 8 and 9 which collect the light and direct it towards the complex outer surface 7. Referring to FIG. 7, surface 8 is a refractive type surface and surfaces 9 are both refractive and reflective type surfaces. These surfaces are swept about an axis 10 to generate an axially revolved profile with a circular curvature as shown in FIG. 8.

Figure 8:
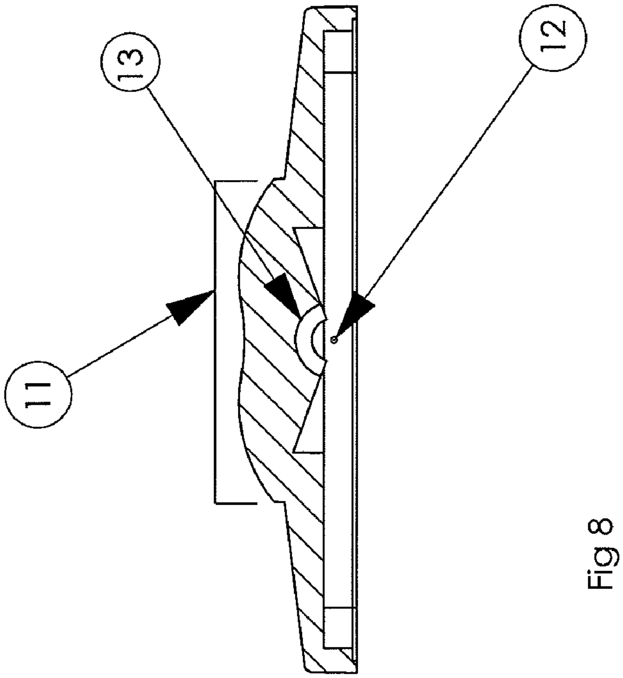
FIG. 8 is a cross-sectional view of the lens of FIG. 6 made transverse to the inner lens axis of revolution depicting the complex outer and inner surfaces of a sidemarker clearance lamp made in accordance with one embodiment of the present invention.

Referring to FIG. 8, the circular shape of the inner surface is created by revolving surfaces 8 and 9 around axis 12 to create the circular curvature shown in 13. Surface 11 in this embodiment is refractive in nature and distributes what would be an approximately cosine shaped major axis intensity distribution, into an evenly illuminated 180 degree output rectangle.

Figure 9:
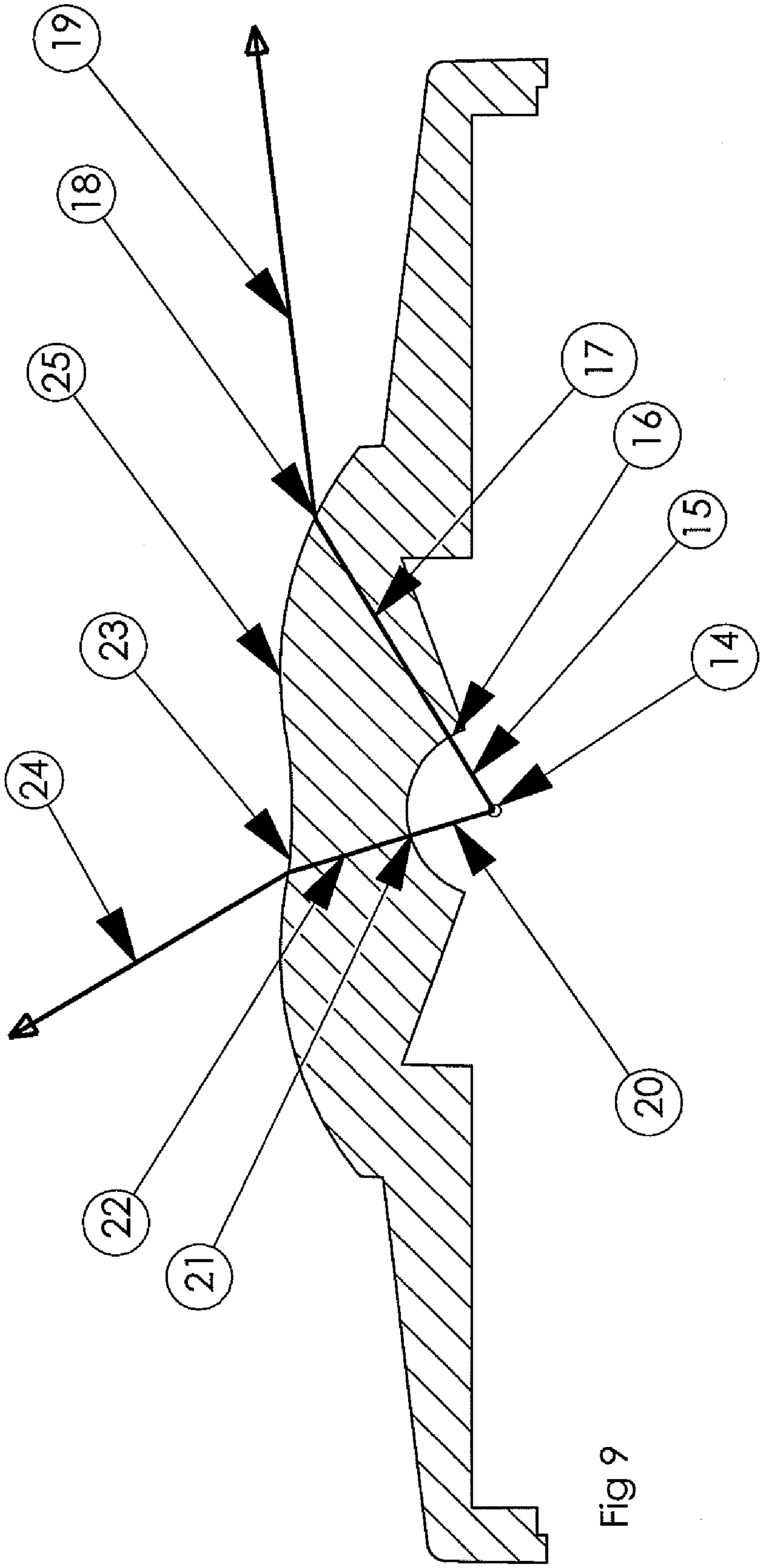
FIG. 9 is a cross-sectional view of the lens of FIG. 6 depicting the paths of two light rays emitting from a point near the axis of revolution on the inner lens and emitting from the refractive outer lens of a sidemarker clearance lamp made in accordance with one embodiment of the present invention.

FIG. 9 depicts two of the ray paths used to generate the major axis output energy distribution. In this embodiment a light ray 15 emits from a point near the lens axis of revolution 14 in a direction impacting the inner lens collection optic surface at point 16. The light refracts minimally as it enters the material along path 17 and proceeds to impact the lens outer surface at point 18. As the light ray exits the material it refracts again and bends along path 19 into the output distribution rectangle. A second ray 20 is also shown emitting from a point near the optical axis of revolution 14 toward inner surface 21 where it refracts minimally along path 22 inside the optical material toward outer surface 25. The ray 22 strikes the outer surface 25 at point 23 refracting along path 24 to generate another point of the required output distribution rectangle.

Figure 10:
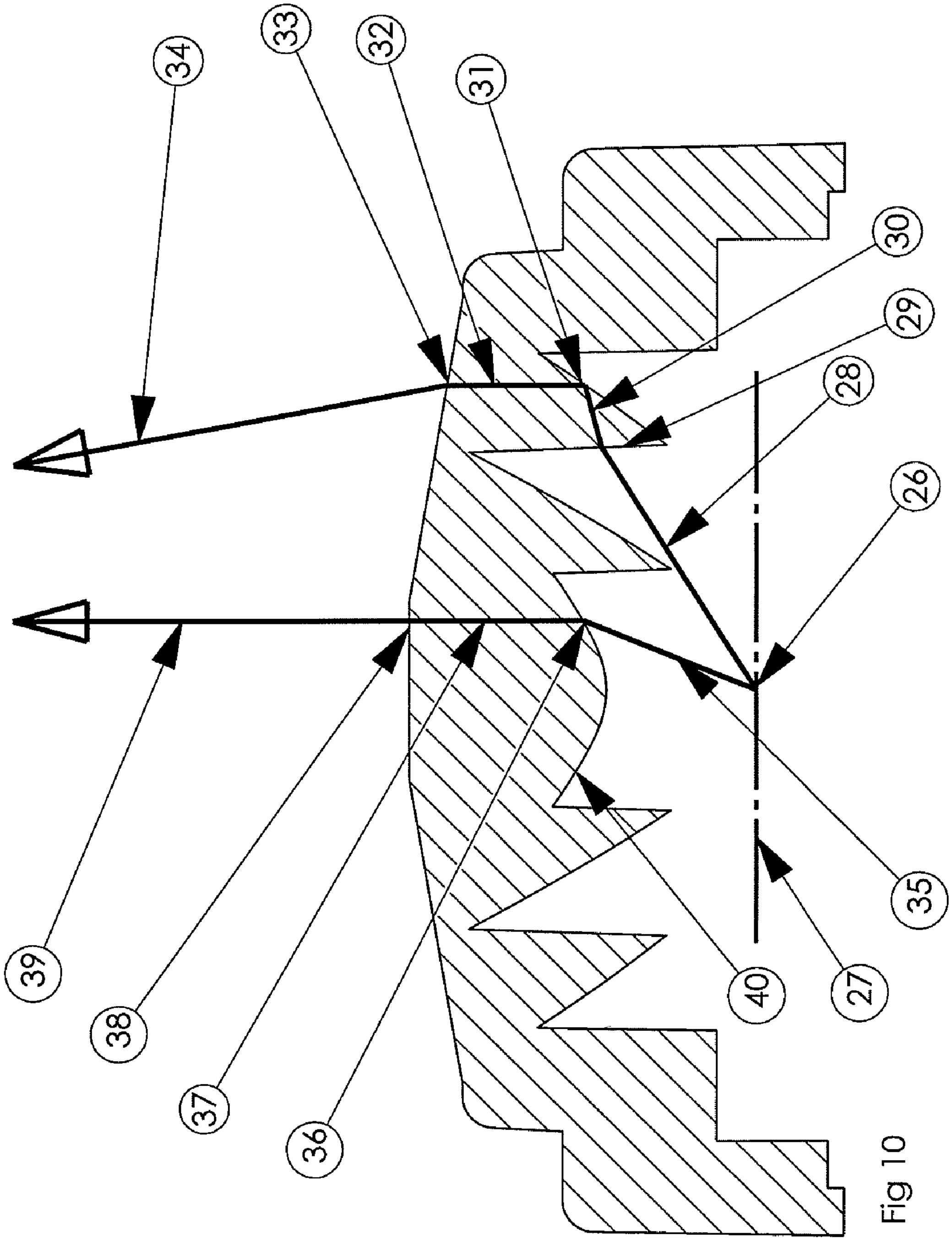
FIG. 10 is a cross-sectional view of the lens in FIG. 6 and orthogonal to the cross-sectional view of FIG. 9 depicting the paths of two light rays emitting from a point near the axis of revolution on the inner lens and emitting from the refractive outer lens of a sidemarker clearance lamp made in accordance with one embodiment of the present invention.

Referring to FIG. 10, light ray 28 emits from a point 26 near the rotational axis of the inner surface 27 and proceeds towards point 29. Light ray 28 strikes the optical collection surface at point 29 and enters the lens material bending according to the laws of refraction along path 30. The ray travelling along path 30 intersects the lens at point 31 at an angle greater than the critical angle for the lens material resulting in total internal reflection of the ray along a substantially vertical path. The now vertical ray 32 proceeds upward to intersect the lens outer surface at point 33 and refracts along path 34 to generate part of the rectangular output requirement along the minor axis of the output distribution. The second ray emitted from the source in FIG. 10 emits from a point 26 near the axis of revolution of the inner surface 27 along path 35 intersecting surface 40 at point 36 and refracting into the lens material. The ray proceeds along a substantially vertical path 37 inside the lens material until it intersects the outer surface at point 38 passing out of the lens material and refracting along path 39 into the required output rectangle.

Figure 11:
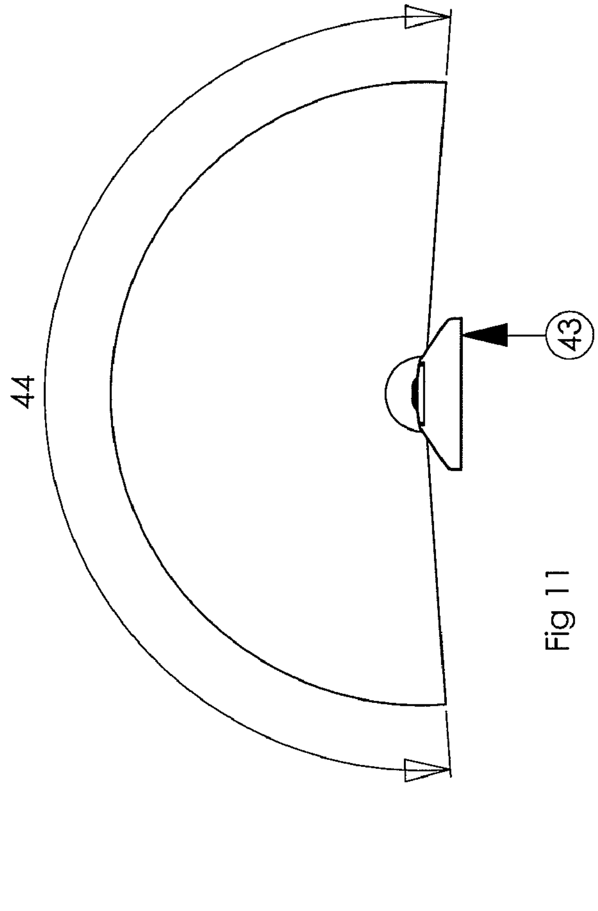
FIG. 11 is a top view of the sidemarker clearance lamp of FIG. 1 depicting the light output pattern in the horizontal plane.

Referring to FIG. 11, the output angle along the major axis 44 is 188 degrees in this embodiment. A cross-section of the surfaces that generate the output distribution in the direction of this major axis is depicted in FIG. 9.

Figure 12:
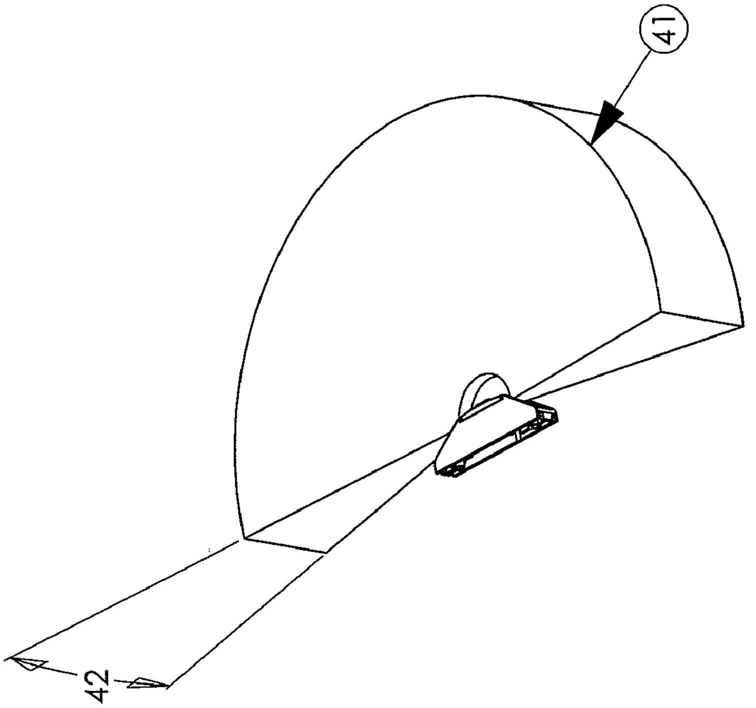
FIG. 12 is a perspective view of the sidemarker clearance lamp of FIG. 1 depicting a three dimensional view of the light output pattern.

Referring to FIG. 12, angle 42 is 22 degrees and represents the minor axis of the output distribution. A cross-section of the surfaces that generate the distribution along the minor axis is depicted in FIG. 10. A lens designed to meet the required angular requirements of a PC sidemarker must generate at least a rectangular distribution according to FIG. 12.

Figure 13:
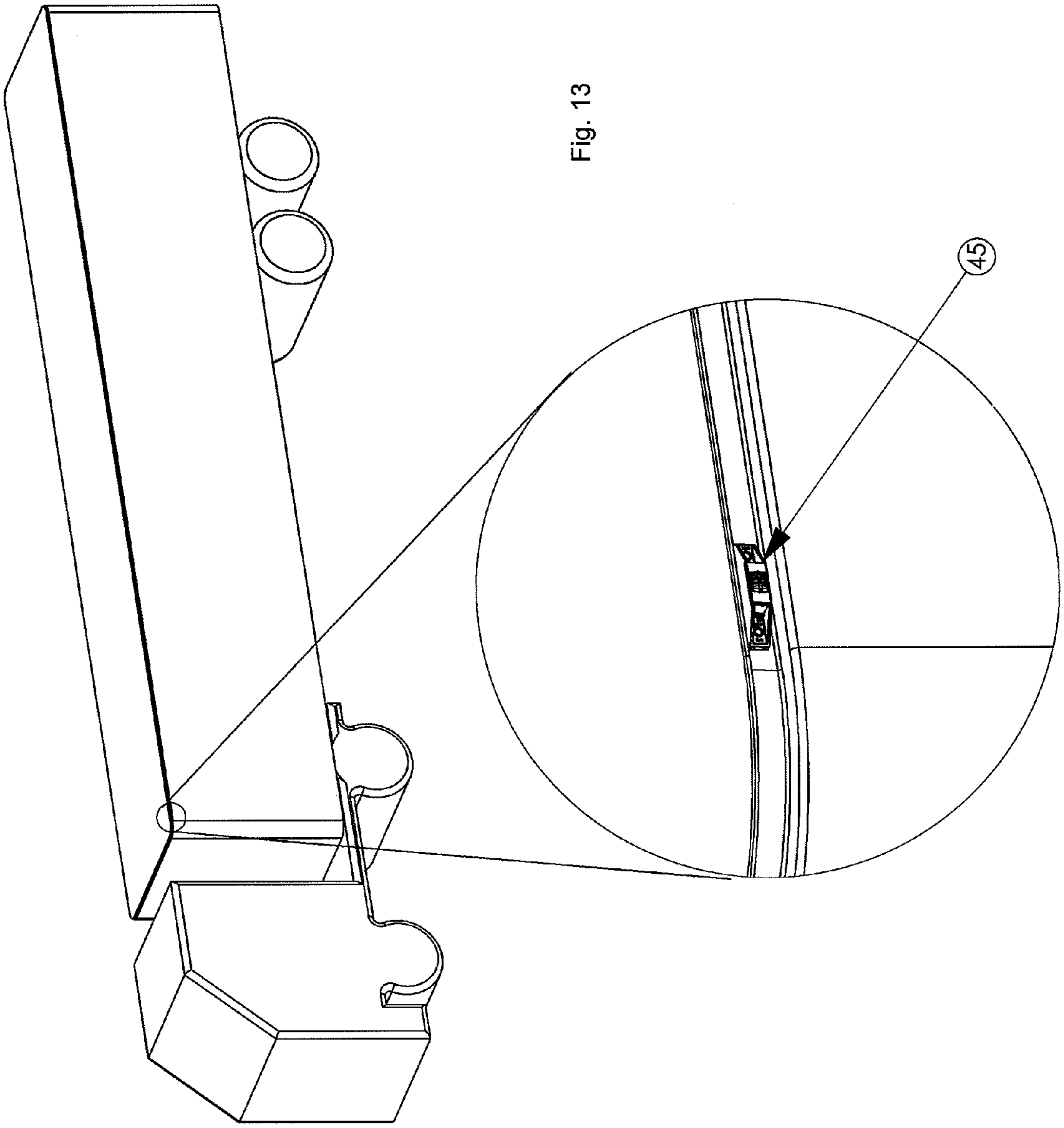
FIG. 13 is a perspective view of a sidemarker clearance lamp device made in accordance with the present invention shown as it would be mounted on a vehicle trailer.

FIG. 13 is a simplified image of a commercial truck showing one possible mounting location of a sidemarker clearance lamp in accordance with the present invention. A PC rated lamp in this position meets all SAE DOT requirements for the front corner clearance lamp and sidemarker lamp.

Figure 14:
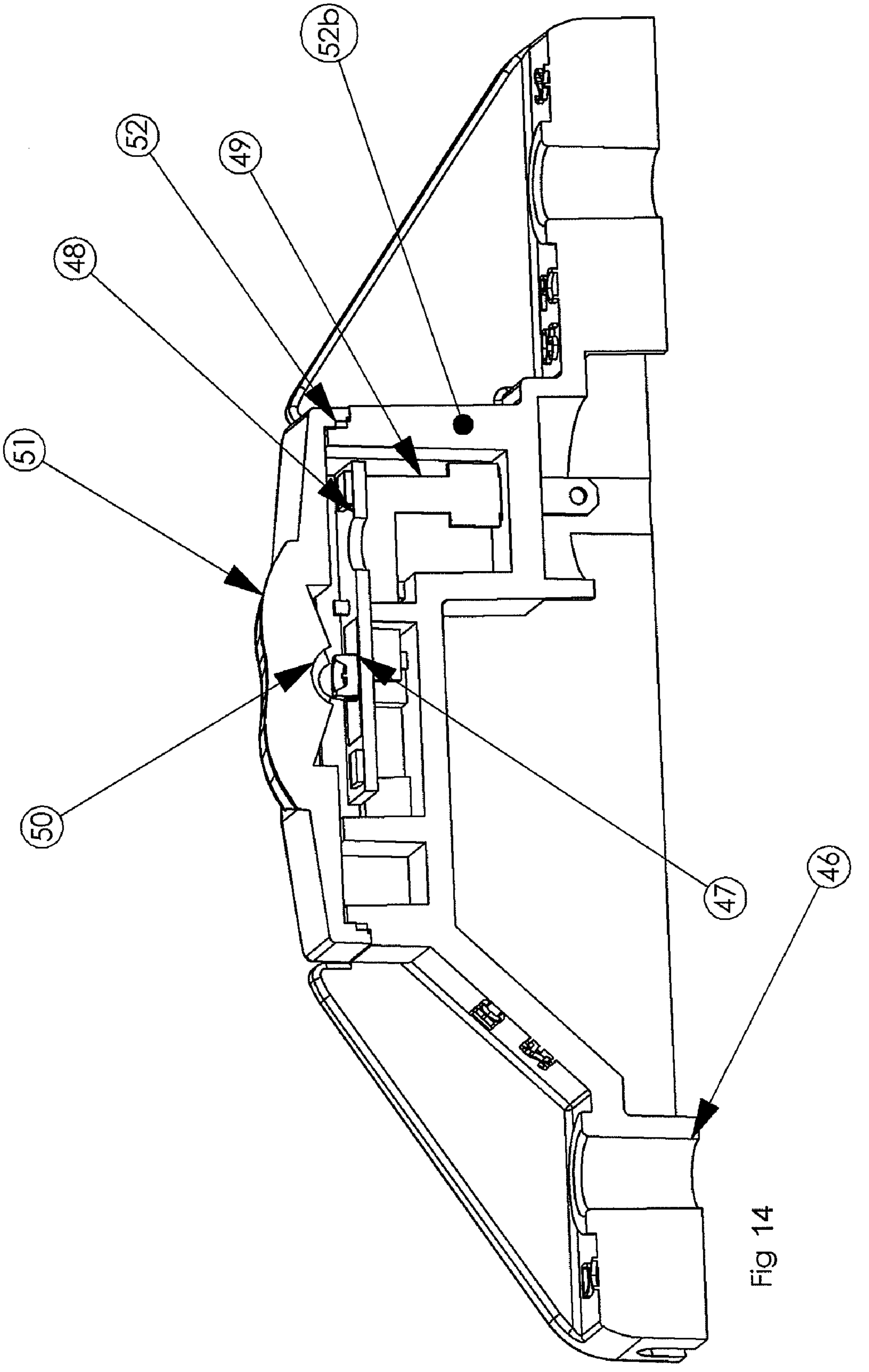
FIG. 14 is a section view of the sidemarker clearance lamp assembly of FIG. 1 detailing the components of the device.

FIG. 14 is a close up view of the sidemarker clearance light 45 as mounted on the truck in accordance with the present invention. When the light 45 is turned on, as shown in FIG. 12, the output distribution of the light is oriented in a horizontal plane.

FIG. 14 is a cross-sectional view of the components of a PC rated sidemarker clearance light as shown in FIGS. 1 through 4 in accordance with the present invention. Light body 52 fixes the circuit board assembly 48 under the lens of FIGS. 5 and 6 over a wide 120 degree viewing angle surface mount LED source 47. Power is provided to the lamp assembly through connector 49 to energize the circuit board and LED. Light from the LED source 47 emits upward and impinges on the lens inner surface 50 where it is collected and redirected through surface 51 into the rectangular output requirement as dictated by FMVSS 108. The light is attached to the vehicle by fasteners through mounting holes 46. This assembly meets or exceeds the requirements of the United States Federal Motor Vehicle Safety Standard 108.

Figure 17:
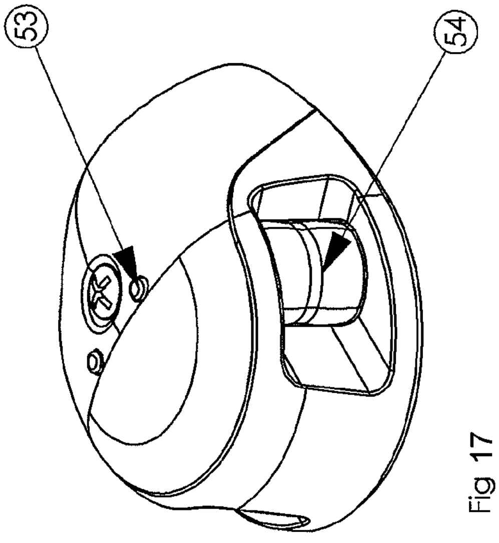
FIG. 17 is a perspective view of the marine bi-color bow light of FIG. 15.
Figure 18:
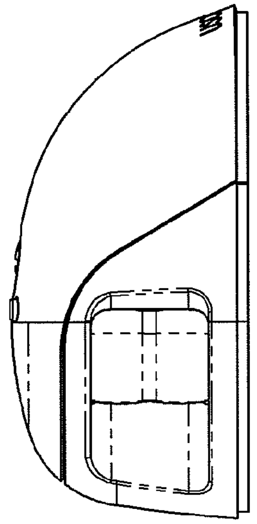
FIG. 18 is a left side view of the marine bi-color bow light of FIG. 15.
Figure 15:
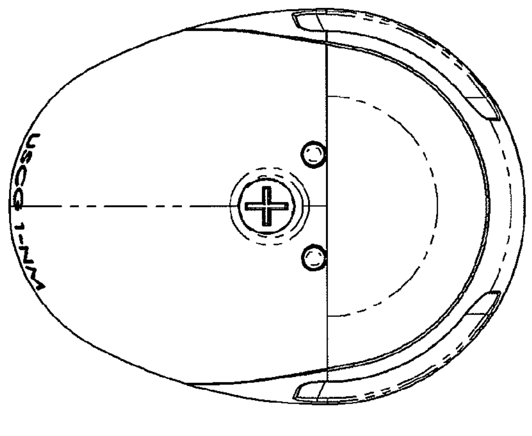
FIG. 15 is a top view of a marine bi-color bow light made in accordance with one embodiment of the present invention.
Figure 16:
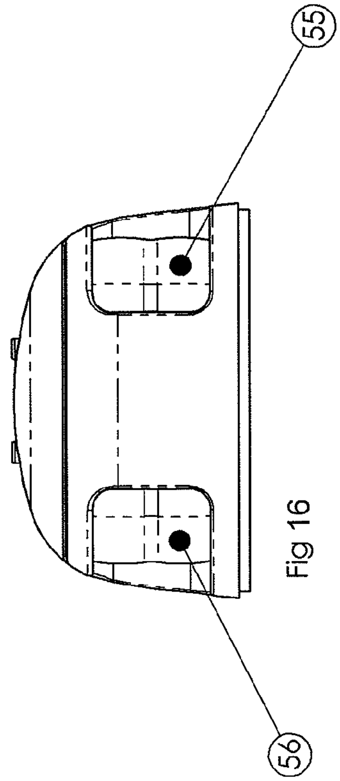
FIG. 16 is a front view of the marine bi-color bow light of FIG. 15.

FIG. 15 through 18 are standard views of a regulated bi-color marine bow light in accordance with the present invention. Regulations, mandated by the United States Coast Guard, dictate that boats must display red and green color navigation lights at the bow in certain operating conditions. A red navigational light 55 must be visible from dead abeam to 112.5 degrees to port and a second green navigational light 56 must be visible from dead abeam to 112.5 degrees to starboard. An additional requirement is that the light must cut off suddenly at the horizontal limits of the pattern according to some complex specifications. Referring to FIG. 16 which depicts the front view of a bow light in accordance with the present invention, the complex shape of the outer surfaces of the red and green navigational lights 55 and 56 are clearly visible. The red and green navigational lights 55 and 56 may not illuminate greater than a specified minimum intensity value at over 3 degrees past the center line of the boat. FIG. 17 depicts a perspective view of a bow light and port lens 54 in accordance with the present invention. A visible marker 53 indicating to the operator the light is functioning protrudes from the top of the light.

Figure 21:
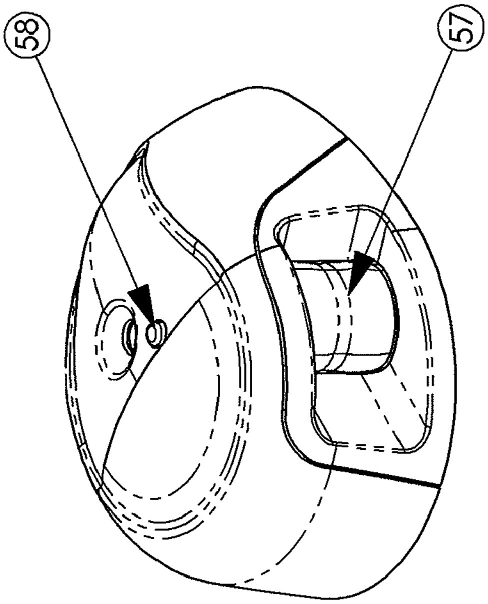
FIG. 21 is a perspective view of the port side red marine bow light of FIG. 19.
Figure 22:
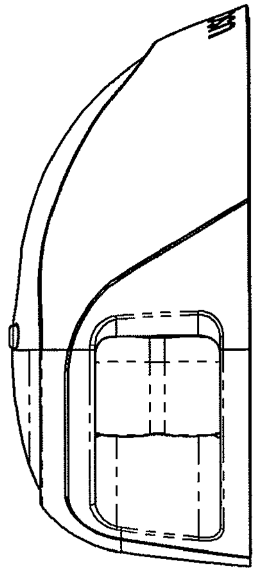
FIG. 22 is a left side view of the port side red marine bow light of FIG. 19.
Figure 19:
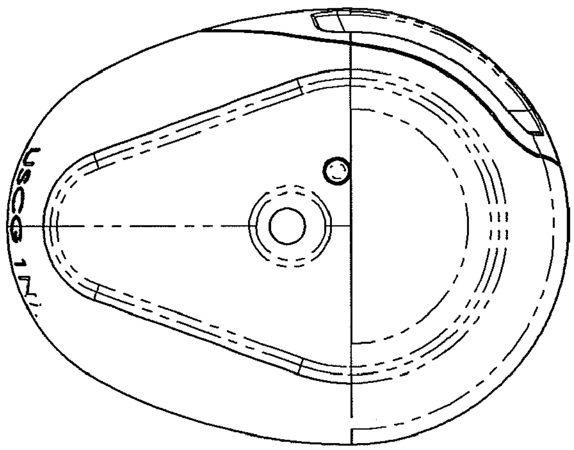
FIG. 19 is a top view of a port side red marine bow light made in accordance with one embodiment of the present invention.
Figure 20:
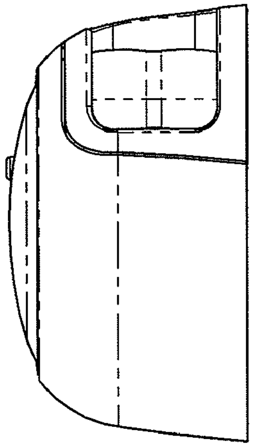
FIG. 20 is a front view of the port side red marine bow light of FIG. 19.
Figure 25:
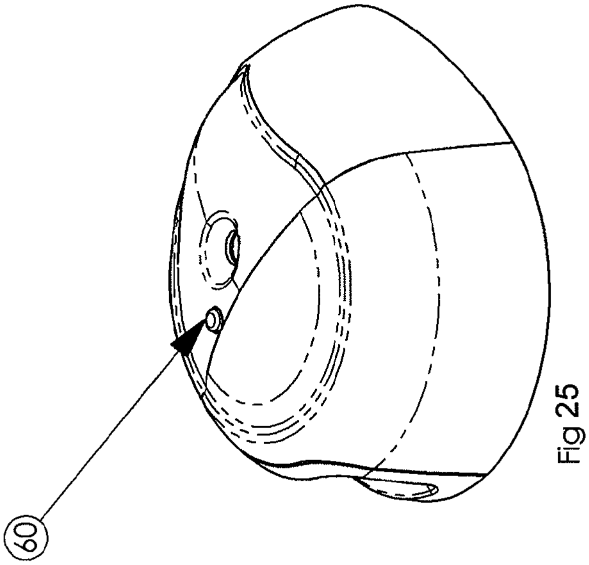
FIG. 25 is a perspective view of the starboard side green marine bow light of FIG. 23.
Figure 26:
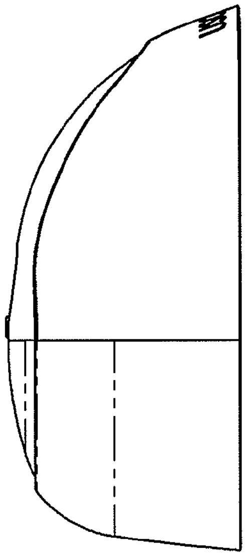
FIG. 26 is a left side view of the starboard side green marine bow light of FIG. 23.
Figure 23:
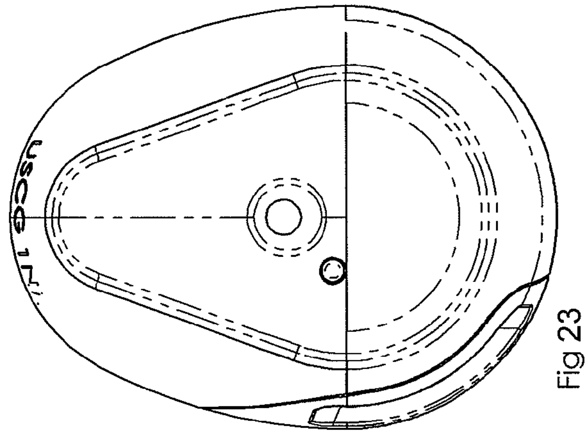
FIG. 23 is a top view of a starboard side green marine bow light made in accordance with one embodiment of the present invention.

FIGS. 19 through 22 are standard views of a red port side marine bow light in accordance with the present invention. FIG. 21 depicts the lens 57 and indicator 58 in the same configuration as the bi-color version of the bow light.

Figure 24:
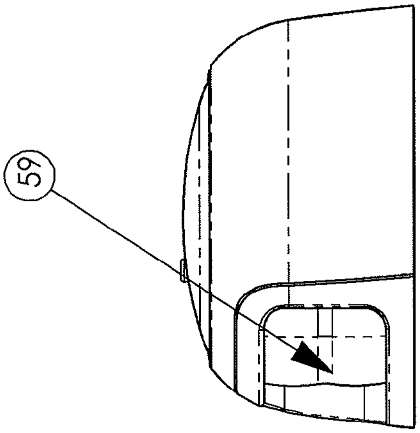
FIG. 24 is a front view of the starboard side green marine bow light of FIG. 23.

FIGS. 23 through 26 are standard views of a green starboard side marine bow light in accordance with the present invention. FIG. 24 depicts the lens 59 and indicator 60 in the same configuration as the bi-color version of the bow light.

Figure 27:
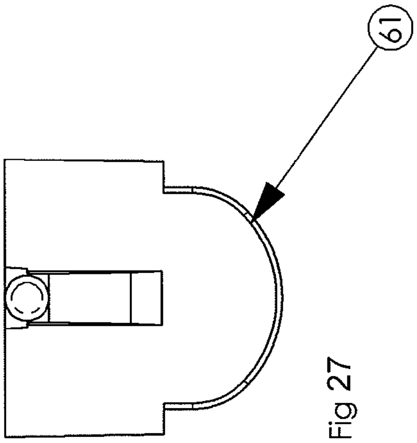
FIG. 27 is a top view of a lens for a marine bow light made in accordance with one embodiment of the present invention.
Figure 28:
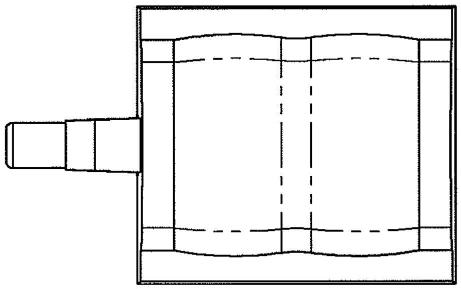
FIG. 28 is a front view of the lens for a marine bow light of FIG. 27.

FIGS. 27 through 30 are standard views of a marine bow lens in accordance with the present invention. FIG. 27 depicts a top view of the lens with the complex shape of outer surface 61 that generates an even output distribution having a width of approximately about 112.5 degrees along the major output axis of the required output rectangle. (Alternatively, the lens can be configured to create a transom light that having a distribution with a width of approximately about 135 degrees along the major output axis) It is important to note that although the lens surface 61 creates an even output distribution along it's major axis as does the PC side marker clearance lamp lens of FIGS. 1 through 4, it has a significantly different shape than the sidemarker lens surface 3 of FIG. 4. This shape difference is required due to the narrower 112.5 degree output distribution of the marine requirement as compared to the 180 degree requirement of the PC rated sidemarker clearance lamp.

Figure 29:
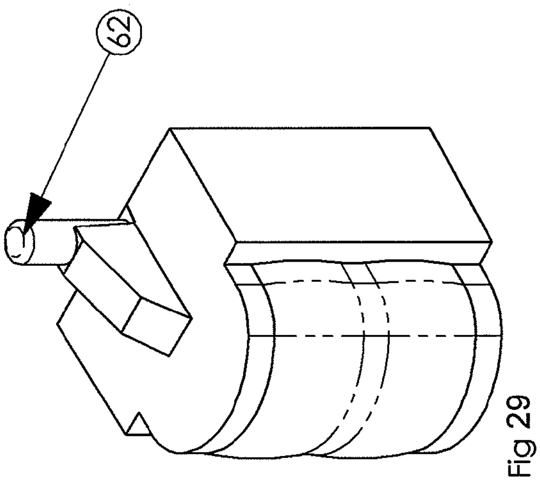
FIG. 29 is a perspective view of the lens for a marine bow light of FIG. 27.

FIG. 29 is a perspective view of the bow lens showing a light guide 63 for carrying the light from the source into the indicator 62 which is visible to the operator.

Figure 30:
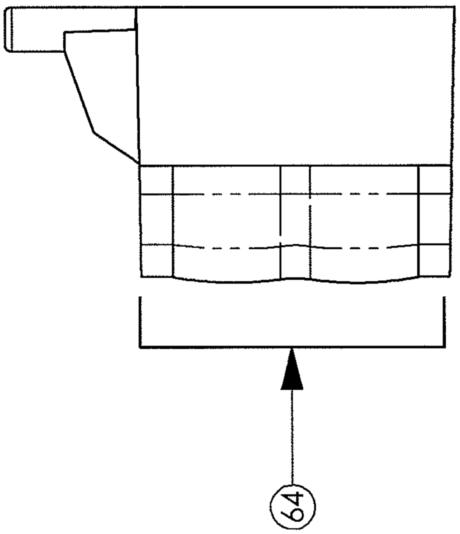
FIG. 30 is a left side view of the lens for a marine bow light of FIG. 27.

As shown in FIG. 30, the surface 64 is significantly different in shape than that of the sidemarker clearance light of FIGS. 1 through 4 as can be seen when compared to minor axis distribution surface 4.

Figure 31:
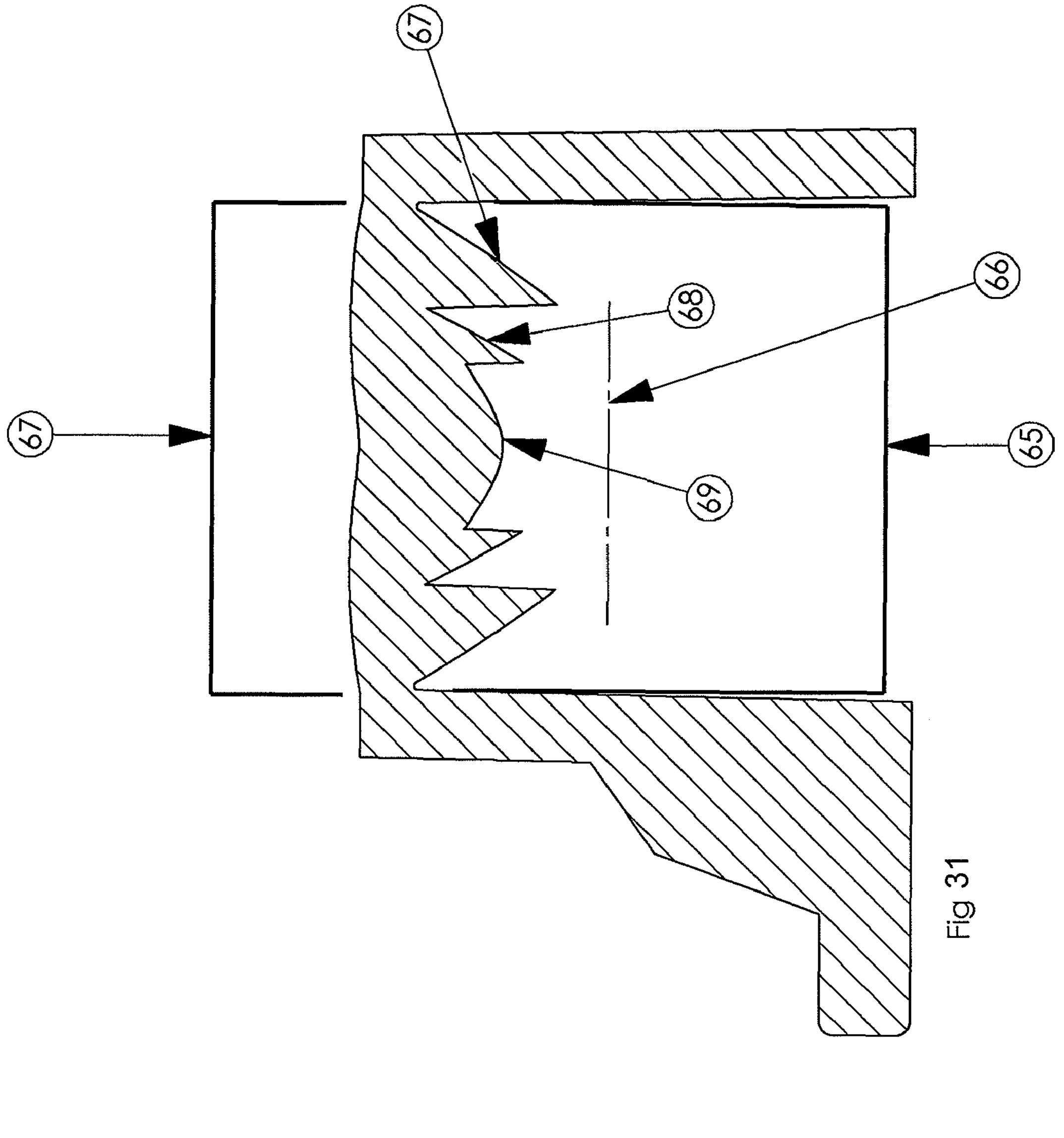
FIG. 31 is a cross-sectional view of the lens of FIG. 29 depicting the complex inner and outer surfaces of a lens made in accordance with one embodiment of the present invention.

As can be seen in FIG. 31, the inner lens surfaces 65 are comprised of similar refractive 69 and total internally reflective surfaces 68 and 67 as are employed in the PC side marker clearance lamp FIG. 7 points 8 and 9. The inner Fresnel surface is revolved around axis 66 in accordance with the present invention to collect the light into a generally rectangular distribution inside the material. The internally reflective surface 67 controls the distribution of the light exiting the material along the minor axis direction.

Figure 32:
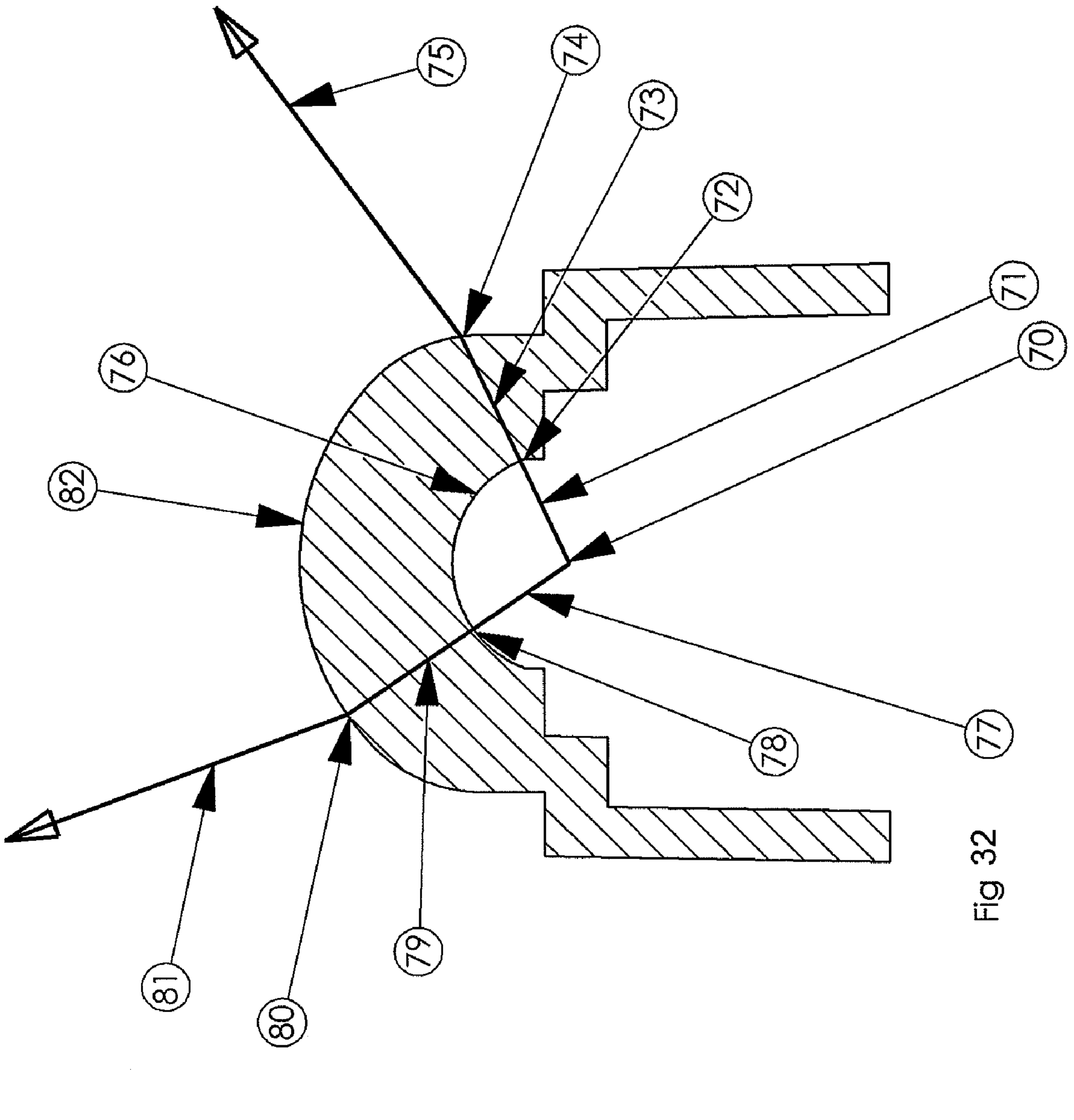
FIG. 32 is a cross-sectional view of the lens for the marine bow light of FIG. 29 made transversely to the axis of revolution of the inner collection optic depicting the path of two light rays passing through the lens.

The rays shown in FIG. 32 demonstrate how the 112.5 degree major axis of the light output distribution is created. Both rays emit near a central focal point 70. The first ray of interest 71, intersects inner lens surface 76 at a point 72 and refracts with minimal angle change into the material along ray 73. The ray 73 then intersects the complex refractive outer surface 82 at point 74 and exits the lens material as exit ray 75. In this example, the exit ray 75 is very near the limit of the pattern width for the bow lens embodiment. It exits the material at nearly ½ of the 112.5 degrees or at approximately 56.25 degrees from the centerline of the lens. A second ray is shown emitting near a point 70 along path 77 intersecting surface 76 at a point 78 and refracting into the lens material along path 79. The ray then intersects outer surface 82 at point 80 and refracts along path 81 into the required output pattern. The combination of all rays emanating form a complex non-point source in combination with the bow lens as described is required to form the government regulated rectangular output distribution of the device.

Figure 33:
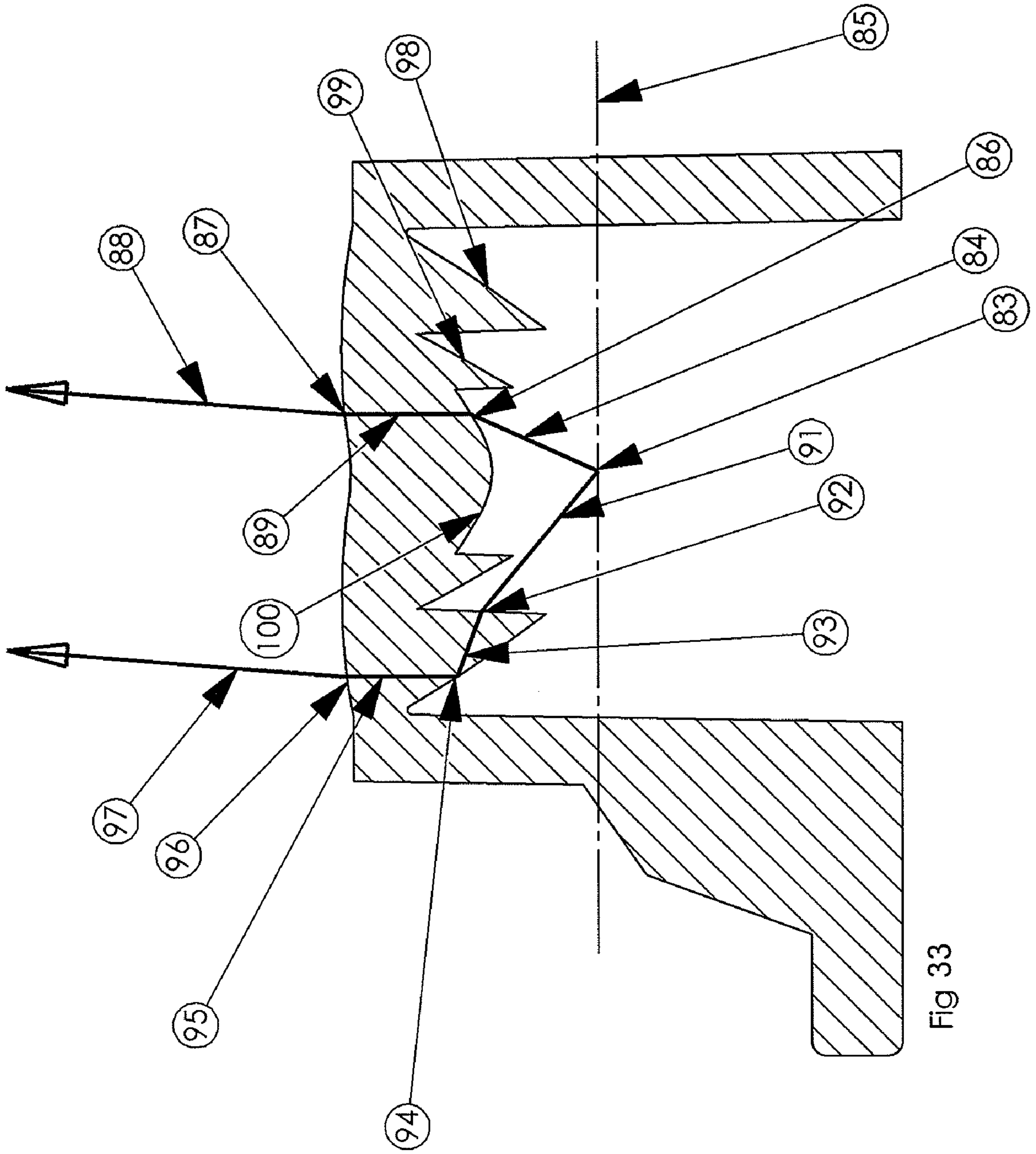
FIG. 33 is a cross-sectional view of the lens for the marine bow light of FIG. 29 made parallel to the axis of revolution depicting the path of two light rays passing through the lens.

As shown in FIG. 33, both rays emit from a point 83 near the axis of revolution 35. The first ray emits along path 84 striking complex refractive surface 100 at point 86. The ray enters the material refracting along path 89 travelling through the optically transparent material in a generally vertical direction striking outer surface 90 at point 87. The ray then refracts a second time as it exits the outer material along path 88 into free air. A second ray is shown travelling along path 91 striking the complex lens inner surface at point 92 and refracting into the material along path 93. The ray strikes the surface of the lens on reflective surface 98 at point 94. The lens is designed such that the angle to the surface normal at the intersection point is greater than the critical angle for the material causing the ray to internally reflect toward outer surface 90. The ray 95 in this embodiment is generally vertical and parallel to ray 89 inside the material and strikes outer surface 90 at point 96. The angle of outer surface 90 causes ray 95 to refract along path 97 as it exits the lens material. The combination of all rays emitting from a complex physical source such as an LED and passing through the complex refractive surface 100 and reflective inner surfaces 99 and 98 and being distributed by complex outer surface 90 is what creates the required output distribution in the minor axis.

Figure 34:
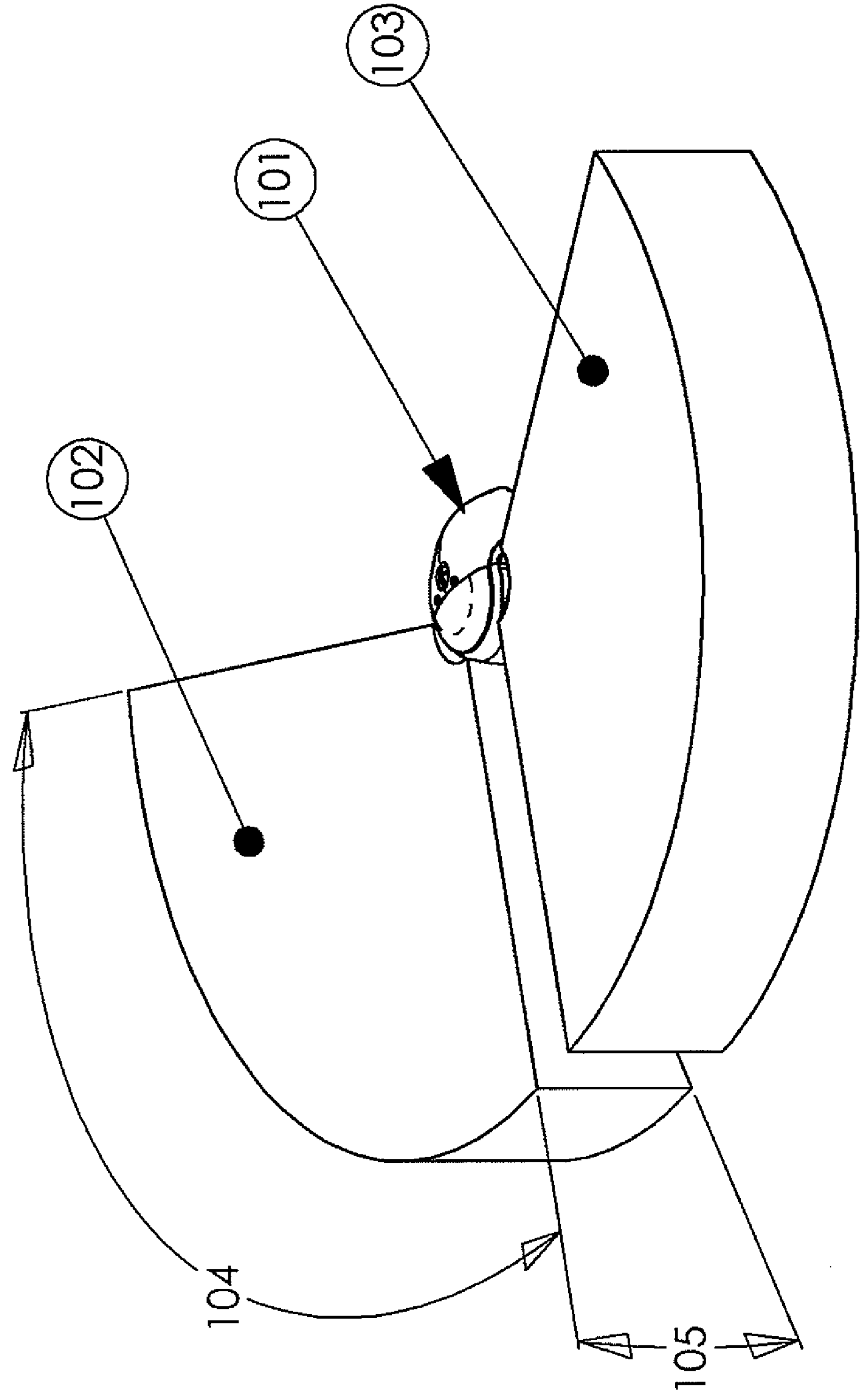
FIG. 34 is a perspective view of a bi-color marine bow light assembly with the addition of two surfaces representing the light output from a lens made in accordance with one embodiment of the present invention.

As shown in FIG. 34, the bow light assembly 101 emits both red 103 and green 102 light from its separate lenses as shown in FIGS. 28 through 31. Each lens is used to generate ½ of the required pattern. The starboard light as defined by the United States Coast Guard in COLREGS requires that the light from the bow lens be projected in an output rectangle of 112.5 degrees wide in the major axis 104 by a minimum of 15 degrees in height on the minor axis 105. The pattern is repeated a second time for the red port side with the same angular limits.

Figure 35:
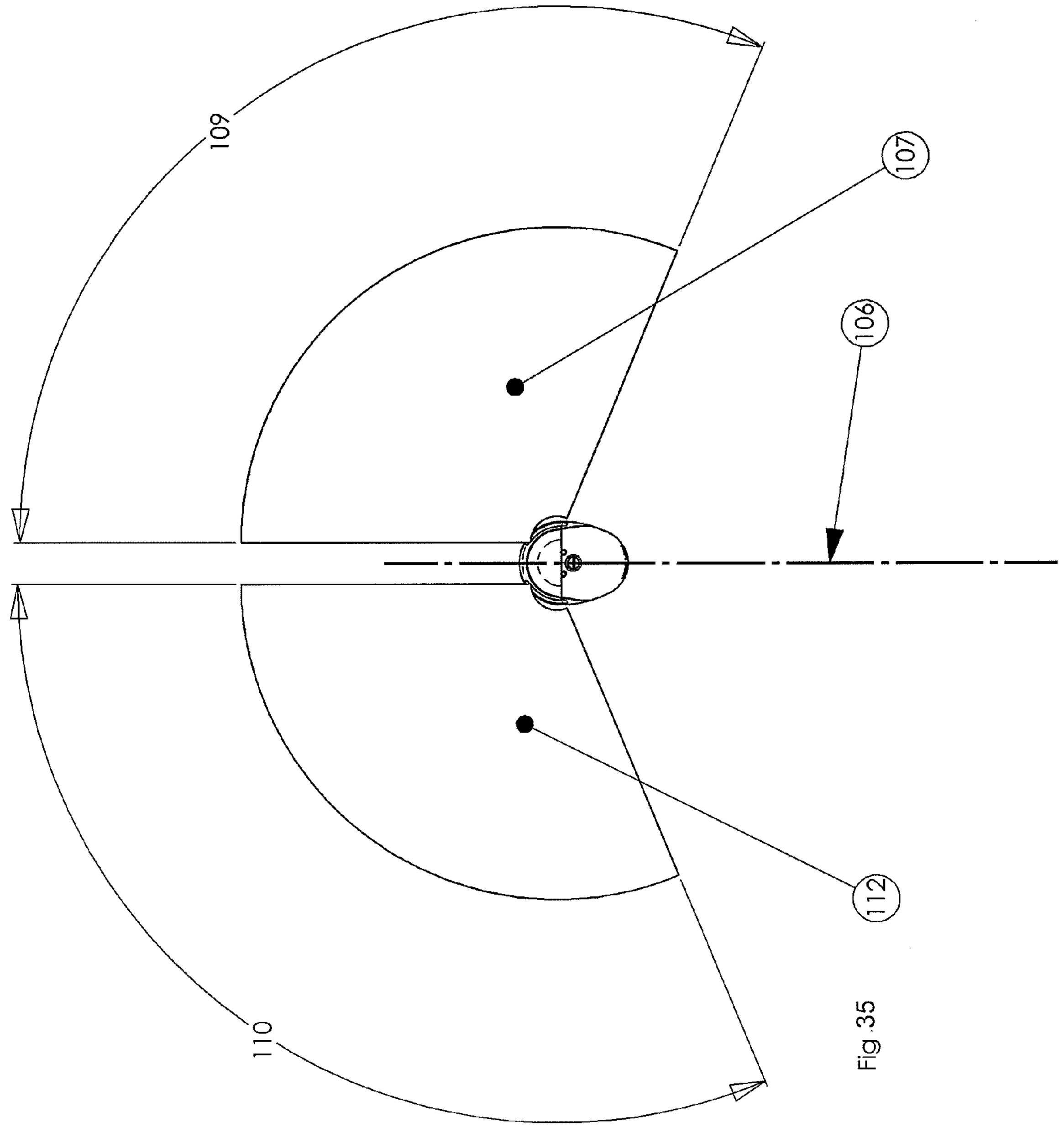
FIG. 35 is a top view of a bi-color marine bow light assembly with the addition of two surfaces representing the light output from a lens made in accordance with one embodiment of the present invention.

As shown in FIG. 35, the starboard side green light 107 emits from the light through 112.5 degrees 109 in the major axis. The port side red light 112 emits from the light through 112.5 degrees 110 in the major axis. The light output from each light does not cross the center axis 106 by more than 3 degrees as required by the United States Coast Guard.

Figure 36:
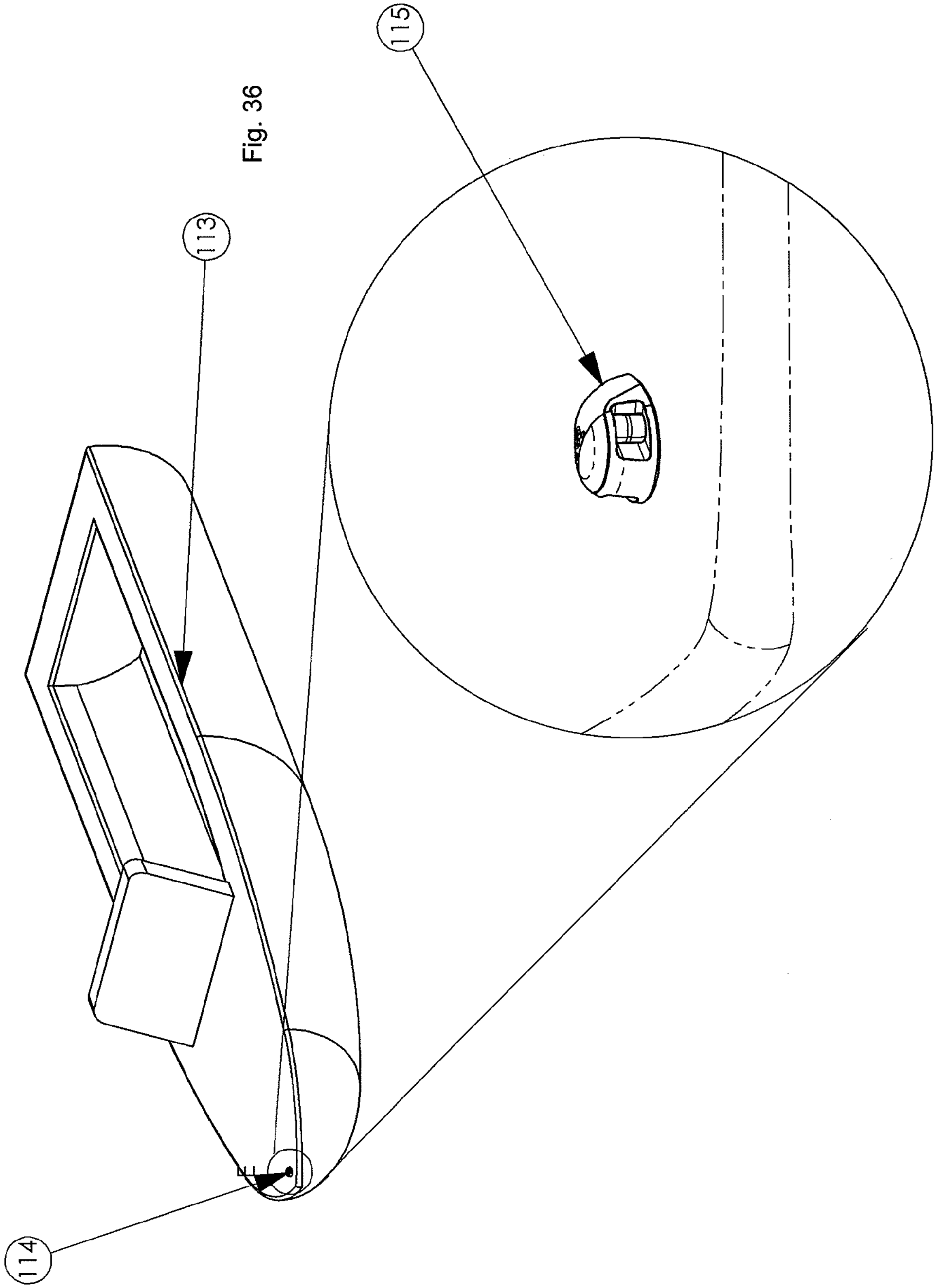
FIG. 36 is a perspective view of a bow light assembly made in accordance with the present invention showing the bow light assembly as it would be mounted on a marine vessel.

As shown in FIG. 36, the bow light is mounted on a marine vessel 114 near the frontmost point of the bow.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

The invention claimed is:

1. An optic comprising:

a lens having an optical axis and a revolved inner surface revolved about an axis perpendicular to the optical axis, and further having a complex outer surface;

a wide output light source generating energy to and through said revolved inner surface and said complex outer surface to create a rectangular output distribution having angular limits of greater than 110 degrees on a first horizontal plane and less than 40 degrees as measured on a second vertical plane that is orthogonal to the first horizontal plane.

2. An optic according to claim 1, wherein the optic is a sidemarker clearance lamp with an output image distribution of at least about 0.62 Candelas over a minimum of about 180 degrees as measured in the first horizontal plane along the major axis and about 20 degrees in the second vertical plane along the minor vertical axis, conforming to at least one light specification defined in United States Department of Transportation FMVSS 108 regulations for year 2008.

3. An optic according to claim 1, wherein said revolved inner surface is a cylindrically shaped axially revolved surface having a set of refractive and reflective surfaces.

4. An optic according to claim 3, wherein the axis of revolution of said revolved inner surface is oriented orthogonally to a plane parallel to the major axis of the rectangular output and intersecting the focal point.

5. An optic according to claim 4, wherein said lens has a multi-faceted single or multi-focal Fresnel lens of constant shape when sectioned by any plane parallel to and intersecting the axis of revolution and inner collecting optic surfaces.

6. An optic comprising:

a lens having a revolved inner surface and a complex outer surface, wherein the inner surface is swept in a continuous arc about an axis of revolution perpendicular to the optical axis of the lens; and a light source generating light of less than about 7 lumens in intensity towards said inner surface of said lens such that the output distribution of light from said lens is a HAR rectangular output distribution with a first axis greater than about 180 degrees measured in a first horizontal plane and a second axis greater than 40 degrees measured in a second vertical plane perpendicular to the first horizontal plane that meets the PC sidemarker clearance lamp requirements of FMVSS 108 regulations for year 2008.

7. An optic according to claim 6, wherein said revolved inner surface is a cylindrically shaped axially revolved surface having a set of refractive and reflective surfaces.

8. An optic according to claim 7, wherein the axis of revolution of said revolved inner surface is oriented orthogonally to a plane parallel to the major axis of the rectangular output and intersecting the focal point.

9. An optic according to claim 8, wherein said lens has a multi-faceted single or multi-focal Fresnel lens of constant shape when sectioned by any plane parallel to and intersecting the axis of revolution and inner collecting optic surfaces.

10. A device for creating a predetermined light output distribution having a substantially rectangular shape in angle space, comprising:

a light source having a energy output angle greater than 100 degrees; and a lens having an optical axis:

a group of inner light collecting lens surfaces, wherein said surfaces are defined by a combination of reflective and refractive surface facets swept in a continuous arc about an axis of revolution perpendicular to the optical axis of the lens; and a second complex outer lens surface having a non-planar, non-circular, non-spherical shape, for redistributing the light source energy into a rectangular output distribution having angular limits of greater than 110 degrees on a first independent horizontal plane and less than 40 degrees on a second dependent vertical plane of rotation.

11. A device according to claim 10, wherein the light source comprises at least one LED.

12. A device according to claim 10, wherein the output image distribution conforms to at least one light specification defined in United States Department of Transportation FMVSS 108 regulations for year 2008.

13. A device according to claim 10 wherein the light source comprises at least one LED with a viewing angle greater than 100 degrees.

14. A device according to claim 10, wherein the light source comprises an incandescent lamp.

15. A device according to claim 10, wherein the major axis of the output distribution is greater than 100 degrees.

16. A device according to claim 10, wherein the major axis of the output distribution is greater than 150 degrees.

17. A device according to claim 10, wherein the light source has a viewing angle of greater than 110 degrees.

* * * * *